US009516353B2

(12) United States Patent
Carney Landow et al.

(10) Patent No.: US 9,516,353 B2
(45) Date of Patent: Dec. 6, 2016

(54) AGGREGATING MEDIA CONTENT

(71) Applicant: EchoStar Technologies L.L.C., Englewood, CO (US)

(72) Inventors: Kate Megan Carney Landow, Denver, CO (US); John Anthony Card, II, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 14/675,888

(22) Filed: Apr. 1, 2015

(65) Prior Publication Data

US 2016/0295244 A1    Oct. 6, 2016

(51) Int. Cl.
H04N 7/173 (2011.01)
H04N 21/218 (2011.01)
H04N 21/235 (2011.01)

(52) U.S. Cl.
CPC ...... H04N 21/2181 (2013.01); H04N 21/2353 (2013.01)

(58) Field of Classification Search
CPC .................. H04N 21/2181; H04N 21/2353
See application file for complete search history.

(56) References Cited

U.S. PATENT DOCUMENTS

| 5,661,516 A | 8/1997 | Carles |
| 6,289,165 B1 | 9/2001 | Abecassis |
| 7,546,619 B2 | 6/2009 | Anderson et al. |
| 8,146,126 B2 | 3/2012 | Downey et al. |
| 8,272,009 B2 | 9/2012 | Downey et al. |
| 8,776,115 B2 | 7/2014 | Sheehan et al. |
| 2002/0053078 A1 | 5/2002 | Holtz et al. |
| 2006/0130119 A1* | 6/2006 | Candelore .............. H04N 7/163 725/135 |
| 2008/0205860 A1 | 8/2008 | Holtman |
| 2011/0088059 A1 | 4/2011 | Wilson et al. |
| 2011/0321096 A1 | 12/2011 | Landow et al. |
| 2012/0131025 A1 | 5/2012 | Cheung et al. |
| 2012/0201519 A1* | 8/2012 | Reynolds ......... H04N 21/25891 386/281 |
| 2013/0086601 A1 | 4/2013 | Adimatyam et al. |
| 2013/0188923 A1 | 7/2013 | Hartley et al. |
| 2015/0012706 A1* | 1/2015 | Blinick ............... G06F 12/0802 711/119 |

* cited by examiner

Primary Examiner — Oleg Asanbayev
(74) Attorney, Agent, or Firm — Bejin Bieneman PLC

(57) ABSTRACT

A method for generating a set of aggregated media content includes storing a plurality of segments of media data. The method further includes organizing the segments into a set of aggregated content including content for generating a plurality of sets of assembled content. The plurality of segments includes a first segment and a second segment. The method further includes generating a first set of metadata for the first segment specifying a first source index location of the first segment in the set of aggregated media content and a first target index location of the first segment in a first set of assembled media content, and a second set of metadata for the second segment specifying a second source index location of the second segment in the set of aggregated media content and a second target index location of the second segment in a second set of assembled media content.

16 Claims, 7 Drawing Sheets

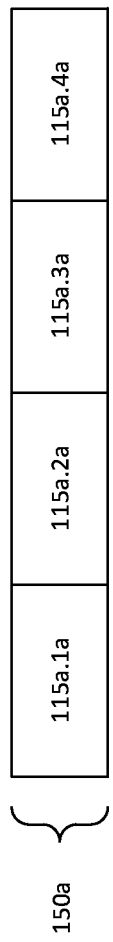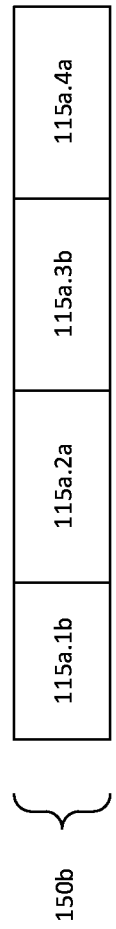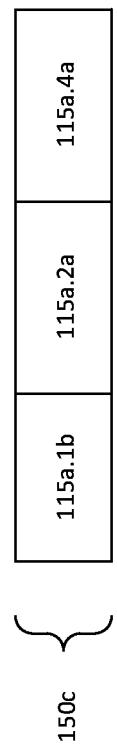

AGGREGATING MEDIA CONTENT

CROSS-REFERENCE TO RELATED APPLICATIONS

This application is related to U.S. patent application Ser. No. 14/675,885, filed Apr. 1, 2015 entitled "AGGREGATING MEDIA CONTENT" and U.S. patent application Ser. No. 14/675,889, filed Apr. 1, 2015 entitled "ASSEMBLY OF MEDIA CONTENT", the complete contents of which are hereby incorporated herein by reference in their entirety.

BACKGROUND

A producer of media content such as a movie will sometimes build multiple versions of the content for distribution, such as one version for video-on-demand services and a second version for network television. In the second version, for example, there may be dialogue replacement in places, or scenes deleted, from the first version. Additionally, additional versions may be created to remove or obscure audio and/or images included in an original or first version of media content. In order to meet the expectations of various customers, a provider of media content presently often must store and distribute multiple versions of a media content item, modified to accommodate different ratings preferences, languages, display formats, etc., thereby making providing different versions impractical and/or causing the media provider to incur substantial costs and inefficiencies.

DRAWINGS

FIGS. 4A-4C are block diagrams of exemplary sets of assembled media content.

DETAILED DESCRIPTION

Introduction

Figure 1:
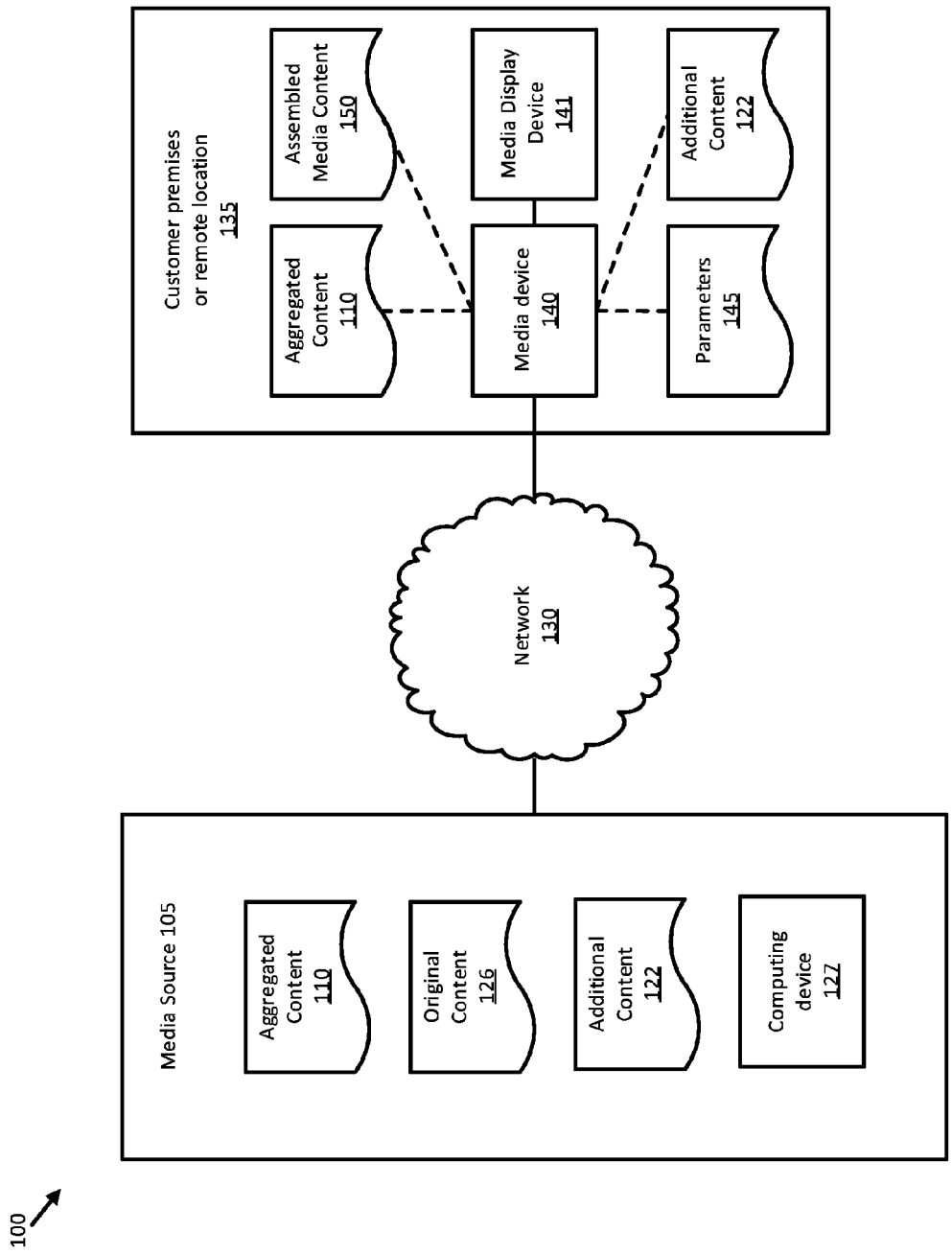
FIG. 1 is a block diagram of an exemplary media content delivery system.

FIG. 1 is a block diagram of an exemplary media content delivery system 100. A media source 105 in the system 100 includes aggregated content 110, e.g., a media file containing data for presenting multiple versions of a media content item 126, e.g., a movie or the like. The aggregated content 110 may be generated by a computing device 127 of the media source 105 or another computing device. The other computing device for generating aggregated content 110 may be directly connected to the computing device 127, connected to the computing device via a wired or wireless network to the computing device 127, or not connected at all to the computing device 127. The aggregated content 110 may be provided via a network 130 to a media device 140. The media device 140 is generally located in a customer premises or remote location 135. Using media content segments 115 (FIG. 2A), metadata 120, segment metadata 121, and/or directory data 125 related to and/or included in the aggregated content 110 as described herein below, the media device 140 can generate versions or sets of assembled media content 150 from the aggregated content 110. To take just one example, one set of assembled media content 150 may be generated for video-on-demand services, and a second set of assembled media content 150 may be generated for network television.

The assembled media content 150 may be generated by using media content segments 115, and possibly making modifications thereto, as described herein below, from the aggregated content 110 and assembling the segments 115 into a set of assembled media content 150. The assembly may be performed before, or during, presentation of the assembled media content 150, e.g., by a media device 140. Further, the assembly may be performed by a computing device included in the media source 105, the media device 140, or another computing device.

For example, the media source 105 may deliver the aggregated content 110 supporting the presentation of multiple versions of a media item 126 to the media device 140. The media device 140, based on parameters 145 stored therein, e.g., which may be received from a user, may extract segments 115 from the aggregated content 110 that are associated with the parameters 145. The media device 140 may then assemble the extracted segments 115 into a set of assembled media content 150 of the movie consistent with the parameters, and display the assembled media content 150.

The assembled media content 150 may be displayed to a user via the media device 140 and/or a media display device 141 such as a television, video monitor, mobile telecommunications device, tablet, or the like. When the assembled media content 150 is referred to herein as being "displayed," it is to be understood that such display could include a variety of known modes of displaying media data, such as a display of visual data, audio data, etc. For example, a set of assembled media content 150 could be displayed by showing video or image data on a screen with or without sound, by playing audio data with or without a visual display, etc.

Figure 2C:
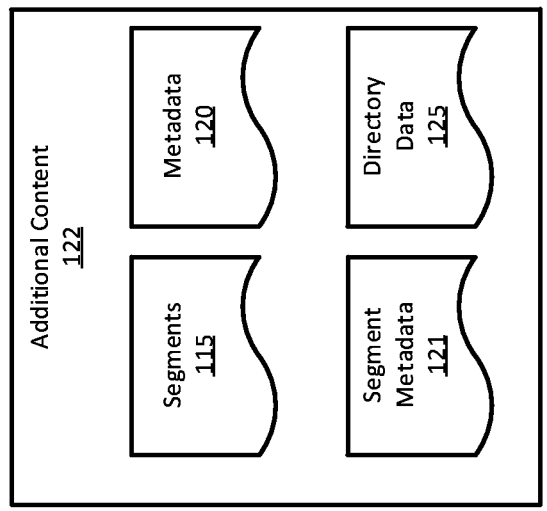
FIG. 2C is a block diagram of additional media content.
Figure 2B:
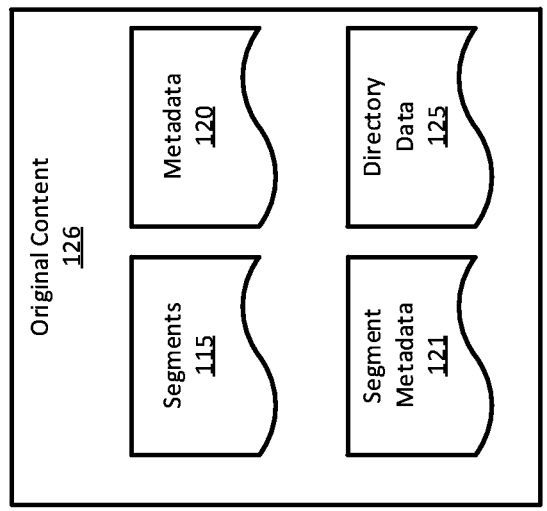
FIG. 2B is a block diagram of original media content.

The media source 105 may generate the aggregated content 110 based on original content 126. The media source 105 may receive the original content 126 from a remote source, for example a producer of media content. The original content 126 may include one or multiple sets or versions of a media content item such as a movie. The original content 126 may be in the form of a continuous stream of media data, or organized into segments 115 of media data (FIG. 2B). The original content 126 may be pre-recorded data and/or live programming data broadcast in real time or close to real time, e.g., with a six second delay. Further, as with the aggregated content 110, the original content 126 may include metadata 120, segment metadata 121 and/or directory data 125.

The media source 105 may further include the computing device 127. As described below, the computing device 127 may be programmed to generate the aggregated content 110 based on the original content 126.

Exemplary System Elements

Media Source

In general, the media source 105 may include multiple elements for processing, storing, and providing original content 126, aggregated content 110 and related data. Elements of the media source 105 may be local to one another and/or may be distributed amongst multiple locations. For example, media source 105 may include computer servers and data storage devices and may specifically include the computing device 127, e.g., for storing and processing original content 126, aggregated content 110 and other data such as discussed herein. The media source 105 may further access computing devices, applications or storage devices available as utilities, i.e., cloud computing services.

The media source 105 may include any one or some combination of various mechanisms for delivering aggregated content 110, e.g., one or more computing devices and storage devices, and may depend on a type of aggregated content 110 being provided. By way of example and not limitation, aggregated content 110 data may be provided as video-on-demand through a satellite, cable, or internet protocol television (IPTV) distribution system, as streaming Internet video data, or as some other kind of data. Accordingly, the media source 105 may include one or more of a satellite or cable television headend, a video streaming service such as generally includes a multimedia web server (or some other computing device), or some other mechanism for delivering multimedia data. In general, examples of aggregated content 110 include various types of data, including audio, video, images, etc.

Communications to and from the media source 105 and the customer premises or remote location 135 may occur via a network 130. In general, the network 130 represents one or more mechanisms for delivering aggregated content 110 from the media source 105 to the media device 140. Accordingly, the network 130 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks, local area networks (LAN) and/or wide area networks (WAN), including the Internet, etc.

Figure 2A:
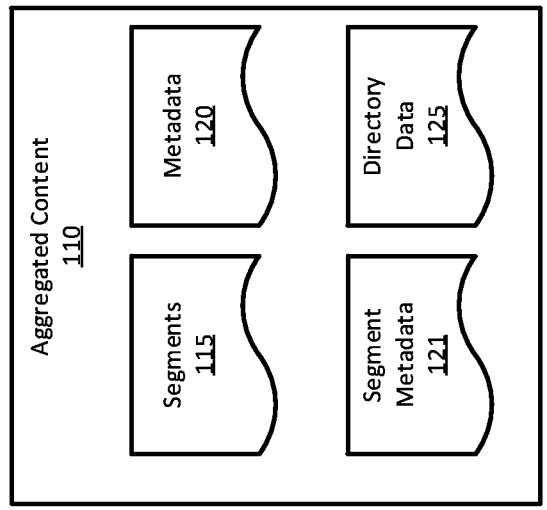
FIG. 2A is block diagram of aggregated media content.

Aggregated content 110 is generally delivered via the network 130 in a digital format, e.g., as compressed audio and/or video data. As shown in FIG. 2A, the aggregated content 110 generally includes, according to such digital format, media data, which may be organized as segments 115, and content metadata 120. For example, MPEG refers to a set of standards generally promulgated by the International Standards Organization/International Electrical Commission Moving Picture Experts Group (MPEG). H.264 refers to a standard promulgated by the International Telecommunications Union (ITU). Accordingly, by way of example and not limitation, aggregated content 110 may be provided in a format such as the MPEG-1, MPEG-2, or the H.264/MPEG-4 Advanced Video Coding standards (AVC) (H.264 and MPEG-4 at present being consistent), H.265/HEVC, MPEG-Dash, or according to some other standard or standards. For example, aggregated content 110 could be audio data formatted according to standards such as MPEG-2 Audio Layer III (MP3), Advanced Audio Coding (AAC), etc. Further, the foregoing standards generally provide for including metadata, e.g. content metadata 120, along with the segments 115, in a file of aggregated content 110, such as the content metadata 120 discussed herein. The aggregated content 110 may further include segment metadata 121 and directory data 125, as described below.

To support efficient processing, the aggregated content 110 may be organized as segments 115. Segments 115 of media data, as used herein, refers to a subset or portion of a media content item 126. Typically, a segment 115 will include media content extending continuously over a period of time and having a start time and end time, such as a scene in a movie. A segment 115, may, however be any set or subset of a media content item 126. Further, the aggregated content 110 may include segment metadata 121 and/or directory data 125, as described below.

The segments 115 are composed of media data. The media data is in a format that is typically provided for general distribution, e.g., a movie, television program, video file, audio file, etc. in a format that has been provided by a distributor of the aggregated content 110. Alternatively or additionally, aggregated content 110 may be modified from the format provided by a general distributor of content (e.g., recompressed, re-encoded, etc.). The segments 115 includes data by which a display, playback, representation, etc. of the aggregated content 110 is presented on a media device 140 and/or display device 141. For example, segments 115 generally include units of encoded and/or compressed video data, e.g., frames of an MPEG file or stream.

The aggregated content 110 may be an aggregation of multiple versions of a media item, e.g., a movie. For example, the aggregated content 110 may include data to assemble multiple versions of a movie such as a video-on-demand version and a made-for-TV version of the movie. As another example, the aggregated content 110 may be an aggregation of multiple versions of a live broadcast, e.g., a sports broadcast with multiple sets of commentators for different geographic regions. The aggregated content 110 may be organized as segments 115, with some segments 115 being common to multiple versions of the media content item, and other segments 115 only occurring in one of the versions. A producer of media content may provide a set of aggregated content 110 in a form ready for distribution. Alternatively, as described below, the producer may provide original content 126 which may be used to generate a set of aggregated content 110.

Content metadata 120 may include metadata as provided by an encoding standard such as an MPEG standard. Alternatively and/or additionally, content metadata 120 could be stored and/or provided separately to a media device 140, apart from the segments 115. In general, content metadata 120 provides general descriptive information for a set of aggregated content 110. Examples of content metadata 120 include information such as content 110 title, chapter, actor information, Motion Picture Association of America MPAA rating information, reviews, and other information that describes a set of aggregated content 110. Information for metadata 120 may be gathered from a content producer, e.g., a movie studio, media information aggregators, and other sources such as critical movie reviews. Further, content metadata 120 may identify a director, producer, screenwriter, star rating, awards, critical reviews, voice-over, story slides, story text, story animations, studio animation for the movie, etc. Still further, content metadata 120 may include instructions described in, e.g., parsable computer code or in a programming language.

Segment metadata 121 is generally associated with a segment 115. By associating time indexes and/or tags in segment metadata 121 with parameters stored in the media device 140, as described further below, segment metadata 121 may be used to generate a set of assembled media content 150 that includes one or more segments 115. Accordingly, a record or instance of segment metadata 121 generally includes an identifier associating the segment metadata 121 with the segment 115. Alternatively and/or additionally, the segment metadata 121 could be included in an item of aggregated content 110, e.g., in a file or collection of files that comprise the aggregated content 110.

The segment metadata 121 generally identifies particular segments 115, and may further associate attributes, e.g., keywords or tags that describe a characteristic of a scene in a movie, with a segment 115. For example, segment metadata 121 may include index locations and/or pointers, such as are known, to a location or locations in the aggregated content 110 that identify a particular segment 115 for which the segment metadata 121 should be applied. In an example, segment metadata 121 may indicate a segment 115 starting at time index 00:45:10 (45 min. and 10 seconds) and ending at 00:47:45 (47 min. and 45 seconds). The segment metadata 121 may further include target index locations and/or pointers to a location or locations in a set of assembled media content 150 where the segment 115 may be displayed. Segment level metadata 121 may further include instructions described in, e.g., parsable computer code or a programming language.

Attributes descriptive of a segment 115 indicated, e.g., pointed to, by the segment metadata 121 may, for example, be stored as tags included in a record or instance of segment metadata 121. The metadata 121 may be stored, for example in a memory included in the media source 105, in a memory of a computing device connected to the media source 105 directly or via the network 130, or a remote memory offered as a utility (i.e., cloud based services). Such attributes or tags could, to provide just a few examples, include items such as language (English, Spanish, etc.), rating (G, PG, R, etc.), color format (black and white, color), display format (television, high definition television, tablet, smartphone), intensity (e.g., mature) etc. Accordingly, a non-limiting example of a record of segment metadata 121 could include an identifier for an item of aggregated content 110, starting and ending time source indexes along with one or more descriptive tags, e.g., {content_ID_403245, 0:10:32, 0:11:02, English language, "black and white", R rating, mature language, non-violent, assembled media content_02, target index location_27}.

Directory data 125 is metadata that is associated with one or more sets of media data 150 which may be assembled from the aggregated content 110. For example, directory data 125 may identify particular segments 115 of aggregated content 110 that are to be used to generate a first set of assembled media content 150 from a set of aggregated content 110, and further identify particular segments 115 to be used to generate a second set of assembled media content 150. The directory data 125 may be stored on a medium included in and/or accessible to a media source 105, providing a specified order of segments 115 to the parameters 145 and a specified order of segments 115 for generating a set of assembled media content 150. Directory data 150 may further include instructions described in, e.g., parsable computer code or a programming language.

As noted above, a producer of media content may produce and provide content 126 in the form shown in FIG. 2B, such that the content 126 serves as aggregated content 110, i.e., includes data that supports the generation of multiple sets of assembled media content 150. For example, when producing a movie, the producer may create alternate or additional scenes that support the generation of multiple versions of the movie. The producer may then organize the media data 126 as segments 115, and combine the segments 115 into a set of aggregated content 110.

A producer of media content may provide original content 126. Original content 126, is generally media content delivered according to a digital format, such as compressed audio and/or video data. As with aggregated content 110, original content 126 may be provided in a format such as the MPEG-1, MPEG-2, or the H.264/MPEG-4, or according to some other standard or standards. Based on the original content 126, the media source 105 may generate a set of aggregated content 110, e.g., a single MPEG file. The original content 126 may be organized as a single stream of media data. Alternatively or additionally, as shown in FIG. 2B, the original content may include segments 115, metadata 120, segment metadata 121 and/or directory data 125.

In one example, the original content 126 may be provided by a producer of media content in a form already prepared for aggregation, as noted above. The original content 126 may include segments 115 for generating one or more set of assembled data 150. The original content may include segment metadata 121 or directory data 125 associated with the segments 115. A computing device associated with the media source, for example the computing device 127, may be programmed to combine the segments 115 with the segment metadata 121 or directory data 125 to generate a set of aggregated content 110.

In another example, the computing device 127 may be programmed to analyze a media content item 126, e.g., using known audio and/or image recognition techniques, and to identify segments 115 within the media content items, as described below. The computing device 127 may be programmed, based on the foregoing analysis, to generate segment metadata 121 or directory data 125 associated with the segments 115. Then, the computing device 127 may proceed to generate aggregated content 110 from the segments 115, segment metadata 121, and/or directory data 125.

Additional content 122 may include alternate or additional content that may be included in the set of assembled media content 150, but that is not found in the aggregated content 110. As shown in FIG. 2C, additional content 122 may include segments 115, content metadata 120, segment metadata 121 and directory data 125.

After receiving or generating a set of aggregated content 110, the media source 105 may provide the set of aggregated content 110 to the media device 140. The media device 140 may download and store aggregated content 110 on a schedule such that popular items of aggregated content 110, e.g., movies or the like, are available immediately to the consumer. As described above, the aggregated content 110 may include data to support the generation of multiple sets of assembled content 150, for example, based on parameters 145. Selecting and generating different sets of assembled content 150 from the aggregated content 110 allows for efficiencies with respect to resources such as bandwidth, processing and memory consumption. User parameters can then be used by the media device 140 to generate the desired assembled media content 150.

Customer Premises or Remote Location

Turning to the customer premises or remote location 135, the media device 140 is generally a device including a computer processor and associated storage, e.g., volatile memory, nonvolatile memory, etc., and capable of communicating via the network 130. Exemplary media devices 140 include a set-top box, a personal computer such as a laptop, handheld, or tablet computer, a smart phone, etc. Further, the media device 140 may be connected to a display device 141, e.g., a television, or may incorporate a display device 141, e.g., a display of a personal computer. A local instance of aggregated content 110 may be stored at the customer premises or remote location 135. As described above, the aggregated content 110 may include media data 115, content metadata 120, segment metadata 121, and directory data 125. The local instance of aggregated content 110 may be stored on a disk or other storage of the media device 140, or in storage accessible to the media device 140, e.g., via a wired or wireless local area network.

Parameters 145 include data related to the user and/or user environment, and may include a desired rating level, the age of one or more viewers, language preferences, characteristics of a media display device, and/or other options associated with the aggregated content 110, etc. For example, the aggregated content 110 may be a documentary describing the making of a movie, including the movie, and the parameters 145 may be "documentary version" to select the documentary including the movie, or "movie version" to skip the documentary scenes and show the movie only.

The parameters 145 may be determined in a variety of ways. By way of example and not limitation, the parameters 145 may be received as user input via a user interface. The user interface may be an interface used to set up the media device 140 or an interface used to select media content for view as is known. Further, the parameters 145 may be determined based on the identity of a media device 140 or media display device 141, e.g., data indicating that the media device 140 is a laptop, tablet, smartphone, etc. The parameters 145 could be associated with a channel selected by a user, or according to an electronic programming guide (EPG). Still further, a cookie, or other software application could identify a media device 140 or media display device 141 being used to display assembled media content 150.

The assembled media content 150 is a version of a media item assembled from segments 115 included in the aggregated content 110 and selected therefrom based on one or more parameters 145. For example, one of the parameters 145 may specify generation of an R rated version of media content. In this example, a set of assembled media content 150 will include segments 115 with an R rating at specific locations within the assembled media content 150. The assembled media content 150 may further, for example, include additional content 122, e.g., advertisements or other content. As with the selection of segments from the media data 115, the additional content 122 included in a set of assembled media content 150 may be selected according to one or more of the parameters 145.

The assembled media content 150 may be an MPEG file or the like, and may be stored in a memory or storage of the media device 140. The assembled media content 150 may be generated prior to any request for the assembled media content 150, e.g., according to a scheduled time or some other trigger, based on stored parameters 145. Alternatively, the assembled media content 150 may be generated substantially contemporaneously with a request for viewing the assembled media content 150, including identification of a set of applicable parameters 145. Note that, although the assembled media content 150 is shown in the exemplary system 100 as being assembled and stored by the media device 140, a set of assembled media content 150 could be generated and/or stored remotely from the media device 140. For example, parameters 145 could be provided to a computing device included in the media source 105, which could then perform operations described herein to assemble the assembled media content 150.

In addition, the customer premises or remote location 135 may include a local copy of the directory data 125. The local copy of the directory data 125 may be metadata associated with one or more versions of media data 150 which may be assembled from the aggregated content 110 and may be a centralized file stored in on a disk or other storage of media device 140. As described above, the directory data 125 may provide a mapping of segments 115 to the parameters 145 and a specified order or sequence of segments 115 for generating one or more versions of assembled media content 150.

Generating Aggregated Content

As noted above, the media source 105 may receive original content 126 and generate a set of aggregated content 110 from the original content 126. As noted above, the original content 126 may be pre-recorded, or live programming broadcast in real time or close to real time.

For example, a producer of the media content item may generate segments 115 of media content 126 sufficient to support generation of multiple sets of assembled media content 150. Some of the segments 115 may be appropriate for each of the sets of assembled media content 150, and other segments 115 may be appropriate for only particular sets of assembled media content 150.

The producer may generate segment metadata 121 or directory data 125 associated with a set of segments 115. The segment metadata 121 or directory data 125 may include tags identifying the set or sets of assembled media content 150 in which each segment 115 is to be displayed and target index locations where each segment 115 is to be displayed within the set or sets of assembled media content 150. The computing device 127 may be programmed to aggregate the segments 115, segment metadata 121 and/or directory data 125 into a set of aggregated content 110.

For example, the producer may generate original content 126 in real time or close to real time from, e.g., a sports event. The original content 126 may contain segments 115 for display in multiple or all versions of assembled content 150, e.g., segments 115 of video of the sports event. The producer may further provide segments 115, for example commentary, local sports news, or other items of local interest, for display in particular, but not all, versions of assembled content 150.

As another example, a provider of media content may receive a single item of original content 126 and may wish to generate multiple sets of assembled media content 150 from the original content 126.

For example, the single original media content item 126 may be a documentary of the production of a movie that includes segments 115 of commentary describing the production process interspersed with segments 115 of the movie. The provider may wish to provide a set of aggregated content 110 including both a first set of assembled media content 150 including both the commentary and the movie, and a second set of media content 150 including only the movie.

The provider, according to programming in computing device 127, for example, may generate a set of identified segments 115 from the original content 126. Identified segments 115 may have a common theme such as a scene of the movie or a portion of commentary. The computing device 127 may be programmed to use image and/or audio recognition techniques such as are known to identify segments 115 of the original content item 126 that are commentary, and segments 115 of the original content item 126 that are the original movie. The computing device 127 may further be programmed to generate segment metadata 121 including target index locations and tags associating each of the identified segments 115 with locations in particular sets of assembled media content 150, and source index locations specifying where the identified segment 115 may be found in the set of aggregated media content 110.

In other cases, the provider may want to generate a set of aggregated content 110 from original media content 126 by identifying one or more segments 115 with an identified characteristic, and generating alternate, modified segments 115. The modified segments 115 may be based on the one or more of the identified segments 115, including, however, modifications to change or mask the characteristic.

For example, an original version of a media content item 126 may include foul language. The provider, with use of the computing device 127, may analyze, including scanning the original content item 126. The computing device 127 may be programmed, using word recognition techniques as are known, to segregate the original content item 126 into identified segments 115 including foul language, and identified segments 115 that are "clean". Further, the computing device 127 may be programmed to generate modified (clean) segments 115 from the segments 115 that included foul language. The modified segments 115 may be generated by removing, replacing or covering up the foul language.

The computing device 127 may further be programmed to generate segment metadata 121 associated with the segments 115. Data (indexes, tags, etc.) in the segment metadata 121 may include a target index location within a set of assembled media content 150 to display each segment 115. The computing device may further aggregate the segments 115 into a set of aggregated content 110.

In other cases, a content provider may wish to generate a set of aggregated content 110 from multiple existing versions of an original content item 126.

For example, a content provider may have access to multiple versions of an original content item 126. A computing device 127 may be programmed to scan the multiple versions of the original content item 126. The computing device 127 may be further programmed, using image and audio recognition techniques, to identify segments 115 that are identical or substantially identical between one or more versions of the media content item 126, and to identify segments 115 that are unique to particular versions of the media content item 126.

Alternatively, or additionally, the computing device 127 may be programmed to identify characteristics of the identified segments 115, for example, the presence of nudity, foul language, etc.

Based on results of the scanning described above, the computing device 127 may generate segment metadata 121 including tags describing characteristics of each identified segment 115, and a target index location of each identified segment 115 within one or more sets of assembled media content 150. The computing device 127 may be further programmed to aggregate the segments 115 into a set of aggregated content 110.

Assembling Media Data for Display

Figure 3:
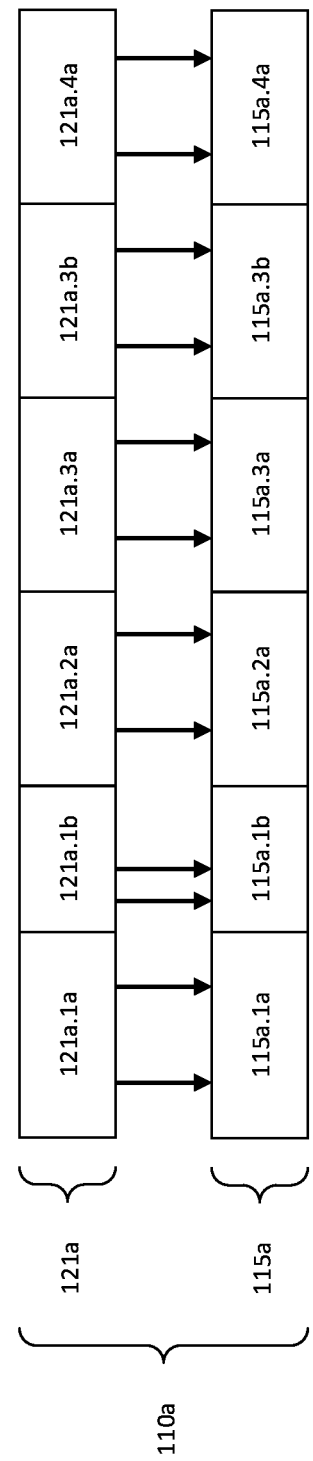
FIG. 3 is a block diagram of an exemplary set of aggregated media content.

As indicated above, one or more sets of media data 150 may be assembled based on a set of aggregated content 110. FIG. 3 is a block diagram of an exemplary set of aggregated content 110a. The set of aggregated content 110a includes a plurality of segments 115a.1a-115a.4a, 115a.1b, 115a.3b for generating multiple sets of a media content 150. The aggregated content 110a may further include segment metadata 121a including a plurality of records 121a.1a-121a.4a, 121a.1b, 121a.3b. Each of the plurality of segments 115a.1a-115a.4a, 115a.1b, 115a.3b may be associated respectively with one of the records of metadata 121a.1a-121a.4a, 121a.1b, 121a.3b. The segment metadata 121a may include source and target index locations, attributes, etc., descriptive of the associated segment.

The exemplary set of aggregated content 110a may be used, for example, to assemble three exemplary sets of assembled media content 150. The three sets of assembled media content 150 may include a first assembled media content 150a, a second assembled media content 150b, and a third assembled media content 150c.

As shown in FIG. 2B, the first assembled set of media content 150a may be referred to as a base version. The segments 115a.1a-115a.4a may be included in the base version of the movie.

Additionally, segments 115a supporting a second assembled set of media content 150b may be included in the set of aggregated content 110a. Modified segments 115a.1b and 115a.3b may be substituted respectively for segments 115a.1a and 115a.3a. Segments 115a.2a and 115a.4a, included in the base set of assembled content 150c may also be used for assembling the second set of assembled content 150b.

Note that it is not necessary for segments 115 occupying a similar location, i.e., determined according to same indices, in the movie sequence to be of the same length, e.g., a same number of frames or same time duration. For example, as shown in FIGS. 3, 4A and 4B, segment 115a.1b may be shorter than segment 115a.1a.

Further, when assembling a set of assembled media content 150, a segment 115 included in aggregated content 110 may be completely omitted. For example, the assembled set of media content 150c shown in FIG. 3D may be a third version of the movie. Segments 115a.1b, 115a.2a and 115a.4a may be included in the set of assembled media content 150c. However, it may be determined, based on the records of metadata 1221a.3a, 121a.3b that material in respective segments 115a.3a, 115a.3b is not targeted for display in the assembled content 150c and should be omitted.

Additional content 122 may also be included in a set of assembled media content 150. The additional content 122 may be additional media content stored on a memory device in the customer premises or remote location 135, or may be media content received from a third party, for example, over the network 130. As with the original content 126, the additional content may include segments 115, metadata 120, segment metadata 121 and directory data 125. Also, as with the original content 126, the additional content 122 may be selected for inclusion in a set of assembled media content 150 based on characteristics identified by tags in the segment metadata 121 or directory data 125.

Figure 5:
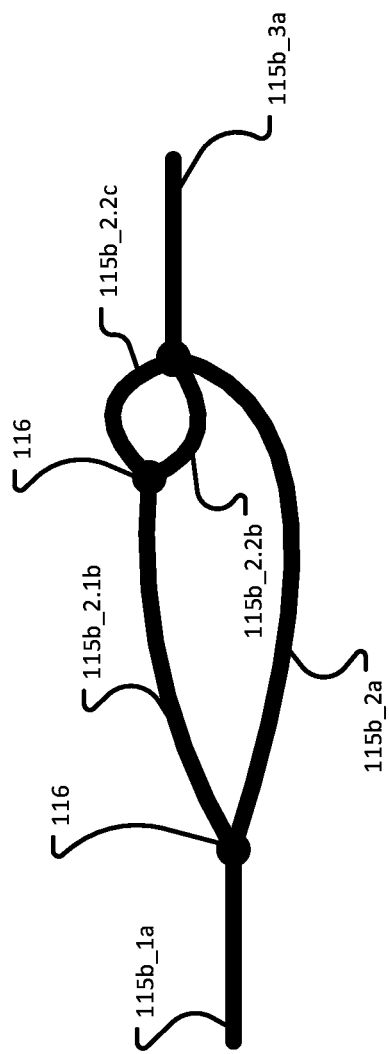
FIG. 5 is a diagram showing alternative branches of sets of assembled media content.

As illustrated in the example branches 116 may exist in a set of aggregated media content 110 such that selecting a first segment 115 for a first location in a set of assembled media content 150 may in part determine the selection of a second segment 115 for a second location in the assembled media content 150. As shown in FIG. 5, three sets of assembled media content 150 (different paths) may be assembled. For example, a first assembled set of media content 150 could include segments 115b.1a, 115b.2a and 115b.3a. In FIG. 5, the segments are represented as portions of lines, to emphasize the branching between sets of assembled media content 150. The base version could be an R-rated version of a movie. For other versions of the movie, segment 115b.1a could be removed, and segment 115b.1b included. A further branch between two segments 115b.1.2b and 115b.1.2c could be made for assembling two different sets of assembled media content 150.

Some segments of media data 115 may be overlaid with other segments of media data 115. For example, one of the parameters 145 could be optional commentary. The optional commentary could be included as separate segments 115. The segments of optional commentary could be associated with records of segment metadata 121 including a target index location and a tag indicating "commentary". The segments of commentary could be included in the set of assembled media content 150 in the event that a parameter 145 indicates that commentary should be included.

Other types of overlays are possible. For example, an overlay may cause a feature (for example a face of a person) to be blurred to prevent identification, or black boxes to be placed over graphic material. Overlays could also be, for example, sound overlays, such as bleeps or silence over foul language, or the addition of music in a particular scene.

Although described as two independent processes, in some cases the aggregation of original content 126 into aggregated content 110 and the assembly of assembled content 150 from aggregated content 110 may be understood as one continuous process. For example, a provider may provide original content 126. By way of example and not limitation, the original content 126 may be live broadcast data. A computing device 127 associated with the media source 105 or another computing device may be programmed to receive the original content 126, identify segments 115, and generate segment metadata 121 describing the segments 115. The computing device 127 or other computing device could further, based on the segment metadata 121, and a set of parameters 145, identify a set of segments 115 for assembly into assembled content 150. Segments 115, for example, with characteristics inappropriate for the set of parameters 145, could be omitted, and replaced with additional content 122, or alternate segments 115. The computing device 127 could provide the assembled content 150 to a media device 140 for display.

Selecting Segments

As discussed above, each segment 115 may be associated with a record of segment metadata 121. Each record of segment metadata 121 may include target index locations indicating where, within a sequence of a set of assembled media content 150, the segment should be displayed. That is, the assembled media content 150 may be organized as a sequence of locations for displaying segments 115. The segment metadata 121 associated with a segment 115 may indicate one or more locations within the sequence where the segment 115 may be displayed. The record may further include tags such as ratings tags (R, PG, PG-13, etc.), age tags (age 4 and below, age 5-9, etc.), broadcast type (sports, news, drama, comedy, etc.), language (English, Spanish, etc.) region (Europe, Japan, Michigan, Seattle, etc.), (display device type (high definition television, television, tablet, mobile telephone, etc.), subtitles, commentary overlays, etc. The media device 140, in order to assemble a set of assembled media content 150, may receive one or more parameters 145 (for example, PG-13 rating, include commentary). Based on the parameters 145, the media device 140 may analyze the segment metadata 121 for each segment 115, and identify associations between the parameters 145 and the tags in each record of segment metadata 121. Based on the identified associations, the media device 140 may determine which segments 115 to display, and locations within a sequence to display the selected respective segments 115.

Alternatively, or additionally, metadata identifying the content of different assembled versions 150 of a media item may be included in the directory data 125. The directory data 125, could, for example, include the target index locations of each segment 115 mapped to different possible combinations of parameters 145. The media device 140 could, based on a set of parameters 145, query the directory data 125 for a list of segments 115, including source index locations identifying each segment's 115 location in the set of aggregated content 110, and additional target index locations identifying the location for displaying the segment 115 within the sequence of one or more sets of assembled media content 150.

It is to be understood that for tags or information in segment metadata 121 to be associated with parameters 145 may mean that there is an exact match, but could also mean that media device 140 includes instructions for determining that a tag is associated a parameter 145 when certain overlapping words or phrases exist within the tags, when the tags include synonyms or the like, and/or where other rules or data indicate that an association should be found. For example, where parameters 145 indicate that that a set of assembled media content 150 should be appropriate for a young audience, the media device 140 may select segments 115 tagged with a G rating. The media device 140 may further, for example, suppress audio segments with a "foul language" tag from being displayed.

As described above, the assembled media content 150 may be assembled in the media device 140. Additionally or alternatively, some or all of the generation of a set of assembled media content 150 may be done by a computing device, e.g., the computing device 127, included in the media source 105, or another computing device. For example, a user of the media device 140 may, via a user interface, select a movie for viewing. The user may further indicate, via the user interface, a preferred version of the movie. Based on the input from the user, the media device 140 may send a request for a set of aggregated content 110 including parameters 145 specifying a particular version. Based on request and the parameters 145, the media source 105 may generate a set of assembled media content 150 consistent with the parameters 145. The media source 105 may then stream the assembled media content 150 to the media device 140 for display.

In some cases, the media device 140, as described above, could be programmed to suppress unwanted content when generating a version of assembled content 150. The media device 140 could be programmed to reject segments 115 that are tagged as having inappropriate material. For example, the media device 140 could reject segments 115 that are tagged as including offensive language. As another example, segments 115 of material appropriate for particular channels could include a security tag in the segment data 121, and the media device 140 could suppress segments 115 that do not include the security tag.

Exemplary Process Flows

Process for Aggregating Content

Figure 6:
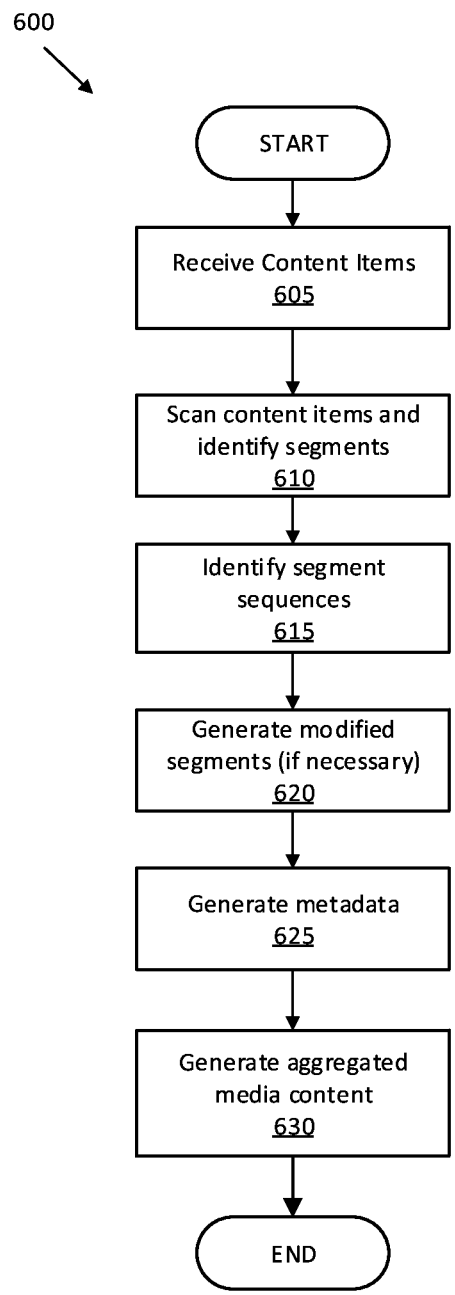
FIG. 6 is a diagram of an exemplary process for generating aggregated media content from one or more media content items.

FIG. 6 is a diagram of an exemplary process 600 for generating a set of aggregated media content 110 from one or more media content items 126. The process 600 is described below as being executed according to instructions stored and executed by a computing device 127 in the media source 105. However, some or all of the process 600 could be executed in other manners, e.g., according to instructions stored and executed by another computing device, and the resultant aggregated media content 110 provided to the media delivery system 100. The process begins in a block 605.

In the block 605, as shown in FIG. 1, a computing device 127 receives one or more original content items 126 for aggregation into a set of aggregated media content 110.

In some cases, the one or more media content items 126 may be an item of media content 126, such as a movie or a live broadcast. A provider of media content may wish to convert the item of media content into a set of aggregated media content 110 that supports the generation of two versions of assembled data 150; i.e., a first and second set of assembled media content 150 for displaying respectively first and second versions of the movie or live broadcast.

In other cases, the one or more media content items 126 may be multiple versions of a media content 126 that should be aggregated into a set of aggregated media content 110. The computing device 127 stores the one or more items of media content 126 on a disk or other storage device associated with the computing device 127. Then the process continues in a block 610.

In the block 610, the computing device 127 analyzes the one or more media content items 126 and identifies segments 115 of the media content 115 for further processing. A segment 115 may be, for example, a set of contiguous frames of a media content item related to a particular scene in a movie.

In the case where aggregated content 110 should be generated from a single item of media content 126, the analysis of the content 110 according to known techniques as mentioned above may include identification of particular subject matter for segregation into identified segments 115. For example, in the case of generating a set of aggregated content 110 supporting a first and second version of assembled content 150 from a first version of original content 126, scanning may target separating the original content 126 into segments 115 that do, and segments 115 that do not include foul language.

In the case where the set of aggregated content 110 is generated from multiple media content items 126, analysis may include identification of segments 115 that are substantially identical in two or more of the media content items 126, and other segments 115 that are unique to a particular media content item 126. The computing device 127 may be programmed to analyze the two versions of media content 126 to identify segments 115 of content that are substantially the same (and therefore only should be included once in the set of aggregated media content 110), and segments 115 that are substantially unique to one or the other version of the media content item 126 (and therefore should be included individually in the set of aggregated media content 110). The process 600 then continues in a block 615.

In the block 615, the computing device 127 identifies a segment sequence for each set of the assembled media content 150. Each segment sequence may include a plurality of locations, organized sequentially, for display by a media device 140.

For example, in the case described above of generating a set of aggregated content 110 supporting first and second sets of assembled media content 150 from an original content item 126, the computing device 127 may be programmed to generate a sequence for reconstructing a set of assembled content 150 of the original content 126 from the identified segments 115. That is, the device 127 may assign a target index location to each segment 115, and generate a location sequence to be used for assembling the assembled content 150 from the segments 115. As further described below, alternate segments 115 may be substituted for original segments 115 in particular locations to generate a second assembled media content 150 for displaying a second version of the original content 126.

Similarly, in the case of generating a set of aggregated content 110 from multiple versions of original media content 126, the computing device 127 may assign a target index location to each segment 115, and generate a respective location sequence to be used for assembling assembled media content 150 for each of the multiple versions. In this case, locations may be divided between locations displaying segments 115 common to multiple versions, and locations displaying segments 115 unique to particular versions of assembled media content 150. The process 600 continues in a block 620.

In the block 620, the computing device 127 optionally generates modified segments 115 from original segments 115. For example, in order to generate a second assembled media content 150 version from the original content item 126, it may be necessary to remove or mask certain material in particular segments 115 from the original first version. The computing device 127 may be programmed to generate alternative segments 115 from the particular segments 115 of the original content item 126 in which, for example, foul language, nudity, violence, etc. are removed, replaced or masked (e.g., with bleeps, black boxes, blurring or the like). After the computing device has completed generating modified segments 115 as warranted, the process 600 continues in a block 625.

In the block 625, the computing device 127 generates metadata associated with each of the segments 115 targeted for inclusion in aggregated media content 110. As described above, the metadata may include segment metadata 121. A record of segment metadata 121 may be associated with each segment 115. The record may include, for example, a target index location indicating a location within each set of assembled media content 150 for displaying the segment 115. The record may further include one or more tags identifying in which versions of assembled media content 150 the segment 115 is intended to be displayed. The one or more tags may include additional information about the segment 115 such as the age appropriateness of the segment, presence of adult content, type of scene, mood of the scene, type of display device, etc.

Additionally or alternatively, the computing device 127 may generate metadata in the form of directory data 125. The directory data 125 may be a structured, e.g., relational or hierarchical, database providing information related to the aggregated content 110 and may include, for example, a listing of the segments 115, an indication of location of each segment 115 within the aggregated content 110, a mapping of segments 115 to locations within different sets of assembled media content 150, and other tags or data describing the segments 115. Following generation of the metadata 121, 125, the computing device 127 continues with a block 630.

In the block 630, the computing device 127 generates a set of aggregated media content 110. The computing device 127 organizes the segments 115 identified in block 610 and additional modified segments 115 into a database. The segments 115 may be organized according to locations indicated in the metadata 121, 125 generated in block 625. The computing device 127 associates/includes the metadata 120, segment metadata 121 and directory data 125 within the aggregated content 110. The computing device 127 stores the set of aggregated content 110, ending the process 600.

Process for Generating Assembled Media Content

Figure 7:
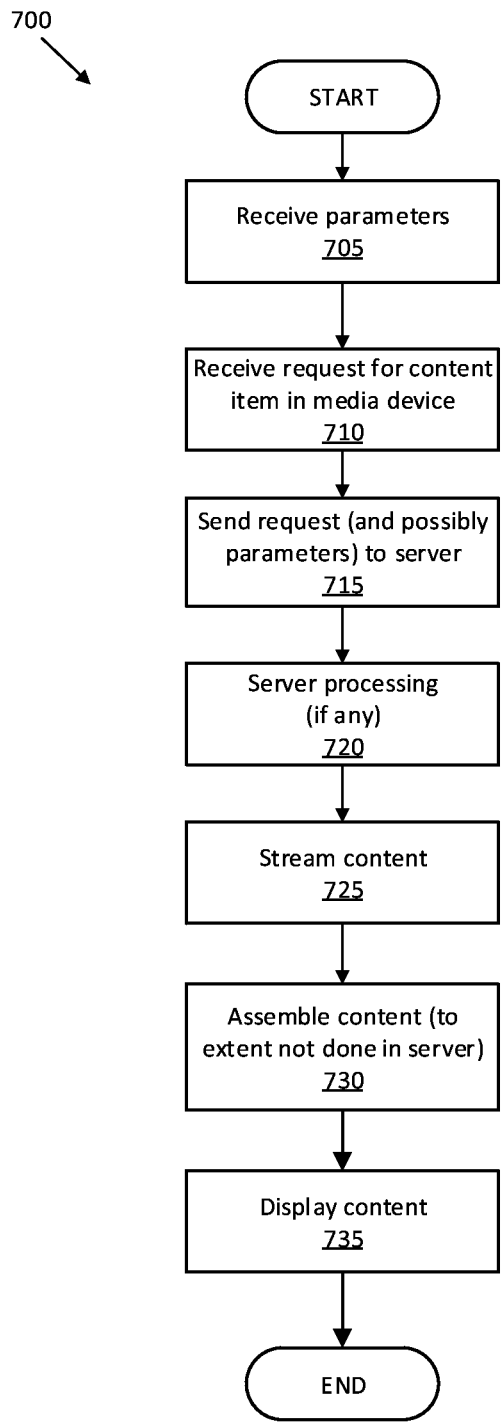
FIG. 7 is a diagram of an exemplary process for delivering and assembling media data from aggregated content.

FIG. 7 is a diagram of an exemplary process 700 for generating a set of assembled media content 150. The process 700 may be executed by a processor of the media device 140 according to instructions stored in a memory of the media device 140. However, as noted above, some or all of the process 700 could be executed in other manners, e.g., according to instructions stored and executed, for example, by a computing device 127 in the media source 105, or another computing device.

In any event, the process 700 begins in a block 705 in which parameters 145, described above, are received by the media device 140. The parameters 145 could be received from a user via a user interface provided according to programming of the media device 140 and/or from a remote device such as a smart phone or the like. For example, a user's preferred parameters 145 may be entered and stored in the media device 140, or a parent may set parameters 145 for types of movies that may be viewed by the parents' children. The media device 140 may be initially programmed with default parameters 145, and/or instructions to display default versions of media content 150 in the absence of receiving specific parameters 145 from a user. Parameters may be determined based on the identity of the media device 140, media display device 141, identity of a channel used for distribution, etc. Additionally or alternatively parameters 145 may be entered during the process of selecting a set of aggregated content 110, as described with regard to a block 710, below.

In the block 710, the user requests a set of aggregated content 110 for viewing. For example, the media device 140 may provide a user interface showing a selection of movies that may be selected. The user may select one of the movies from the user interface. The user interface may further provide version choices to the user. For example, the user may be able to choose between versions with different ratings, versions including or not including commentary, etc. The media device 140 sends a request for the set of aggregated content 110 to the media source 105. Additionally, the media device 140 may store parameters 145 representing user selections in the memory associated with the media device 140.

For another example, the media device may present an electronic programming guide (EPG). The user may select, e.g., a sports event. The media device 140 may send a request for a set of aggregated content 110 to the media source 105 for displaying the sports event. The process 700 continues in a block 715.

In the block 715, the media device 140 sends a request to the media source 105 for aggregated content 110, based on the user selection received by the media device 140 in block 710. The request identifies a set of aggregated content 110, and may include additional information. For example, the request may include one or more of the parameters 145 reflecting the preferences of the user, describing the expected characteristics e.g., suitable for family viewing, of the channel streaming the movie or sports event, parameters 145, describing the type of media display device 141 which will be used to view the assembled content 150, etc. The process 700 continues in a block 720.

In the block 720, the media source 105 prepares the set of aggregated content 110 for transmission to the media device 140. Note that, in cases such as discussed above, no preparation may be necessary. The set of aggregated content 110 includes media data 115 with content for each of the available versions of the media item. The aggregated content 110 may further include metadata 120, segment metadata 121, and/or a directory data 125. In other cases, the media source may identify additional content 122 to transmit to the media device 140. In yet other cases, the media source 105 may assemble a set of assembled media content 150, according to the parameters 145, as described above. The process 700 continues in a block 725.

In the block 725, the media source 105 sends the set of aggregated content 110 and/or additional content 122 to the media source 140. The aggregated content 110 and/or additional content 122 may be transmitted in a variety of ways. For example, the aggregated media content 110 may be provided in one or more manners described above, e.g., as a programming channel in a satellite or cable television system, or as video-on-demand in such a system. Further, the media source 105 may provide the aggregated content 110 and/or additional content 122 via a network such as the Internet. The media source 140 receives and stores the set of aggregated content 110 and/or additional content 122 locally. Additionally or alternatively, the media source 105 may send an assembled set of media data 150. The process 700 continues in a block 730.

In the block 730, the media device 140 generates, to the extent not already completed by the media source 105, a set of assembled media content 150 from the aggregated content 110 and/or additional content 122. The media device 140 extracts segments 115 and/or additional content 122, according to the parameters 145, and assembles them and assembles the set of assembled media content 150 as described above.

Next, in a block 735, the media device 140 displays the assembled media content 150 via the media display device 141.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, etc. Further, the term "exemplary" is used in the sense of signifying an example, e.g., a reference to an "exemplary" widget" should be read as simply referring to an example of a widget.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A method for providing a media file containing data for presenting a plurality of pre-defined assembled media content items, comprising:
    storing, by a first computing device, a plurality of segments of media data, the plurality of segments including one or more first segments for inclusion in a first assembled media content item pre-defined based on a first original media content item, one or more second segments for inclusion in the second assembled media content item predefined based on a second original media content item and one or more third segments for inclusion in the first and the second pre-defined assembled media content items;
    organizing the plurality of segments into the media file containing data for presenting the plurality of pre-defined assembled media content items;
    generating:
        a first set of metadata for each of the one or more first segments specifying respective index locations in the media content media file containing data for presenting the plurality of pre-defined assembled media content items and respective target index locations for the one or more first segments in the first pre-defined assembled media content item,
        a second set of metadata for the one or more second segments specifying respective index locations in the media file containing data for presenting the plurality of assembled media content items and respective second target index locations of the second segments in the second pre-defined assembled media content item included in the plurality of media content items, and
        a third set of metadata for the one or more third segments specifying respective index locations in the media file containing data for presenting the plurality of assembled media content items, respective first target locations in the first predefined assembled media content item and respective second target locations in the second pre-defined assembled media content item; and
    transmitting the media file containing data for presenting the plurality of pre-defined assembled media content items to a second computing device.

2. The method of claim 1, further comprising:
    generating first, second, and third records of metadata respectively from each of the first, second, and third sets of metadata, each of the first records of metadata including the respective first source index location and the respective first target index location, each of the respective second records including the respective second source index location and the respective second target index, and each of the respective third records including the respective third source location, the respective first target location and the respective second target location;
    associating each of the first records of metadata with each of the respective first segments, each of the respective second records of metadata with each of the respective second segments, and each of the third records of metadata with each of the respective third segments; and
    including each of the first, each of the second and each of the third records in the media file containing data for presenting the plurality of pre-defined assembled media content items.

3. The method of claim 1, further comprising:
    generating directory data from each of the first, each of the second, and each of the third sets of metadata, the directory data including each of the first source index locations, each of the first target index locations, each of the second source index locations and each of the second target index locations; and
    including the directory data in the media file containing data for presenting the plurality of pre-defined assembled media content items.

4. The method of claim 1, further comprising:
    receiving a plurality of original media content items, the plurality of original media content items including the first original media content item and the second original media content item;
    analyzing each of the plurality of media content items to identify a plurality of segments of related media content; and
    including the plurality of identified segments in the plurality of segments.

5. The method of claim 4, wherein:
    a first portion of segments identified in the first original media content item is targeted for display in the first pre-defined assembled media content item;
    a second portion of segments identified in the first original media content item is targeted for display in the second pre-defined assembled media content item; and
    the first portion of identified segments is a subset of the second portion of identified segments.

6. The method of claim 4, the plurality of identified segments including a first identified segment, further comprising:
    identifying a characteristic in a first identified segment;
    generating a first alternate segment from the first identified segment, the first alternate segment being modified to alter the characteristic; and
    including the alternate segment in the plurality of segments.

7. The method of claim 4, wherein:
    the identified segments include:
        a first portion targeted for display in each of the first pre-defined assembled media content and the second pre-defined assembled media content;
        a second portion targeted for display in the first pre-defined assembled media content and not intended for display in the second pre-defined assembled media content; and
        a third portion targeted for display in the second pre-defined assembled media content and not intended for display in the first pre-defined assembled media content.

8. The method of claim 7, wherein:
    the first pre-defined assembled media content is substantially identical to the first original media content item and the second pre-defined assembled media content is substantially identical to the second original media content item.

9. A computing device including a processor and a memory, the memory storing instructions such that the processor is programmed to:
    store a plurality of segments of media data in the memory of the computing device, the plurality of segments including one or more first segments for inclusion in a first pre-defined media content item based on a first original media content item, one or more second segments second media content items for inclusion in a second pre-defined media content item and one or more third segments for inclusion in the first and second pre-defined media content items;
    organize the plurality of segments into a media file containing data for presenting the plurality of pre-defined assembled media content items including the first pre-defined assembled media content item and the second pre-defined assembled media content item;
    generate:
        a first set of metadata for each of the one or more first segments specifying respective index locations in the media file containing data for presenting the plurality of pre-defined assembled media content items and respective target first index locations for the one or more respective first segments in the first pre-defined assembled media content item,
        a second set of metadata for the one or more second segments specifying respective index locations in the media file containing data for presenting the plurality of assembled media content items and respective second target index locations of the second segments in the second pre-defined assembled media content item included in the plurality of media content items, and
        a third set of metadata for the one or more third segments specifying respective index locations in the media file containing data for presenting the plurality of assembled media content items, respective first target locations in the first predefined assembled media content item and respective second target locations in the second pre-defined assembled media content item; and
    transmit the media file containing data for presenting the plurality of pre-defined assembled media content items to a second computing device.

10. The system of claim 9, the processor further programmed to:
    generate first, second, and third records of metadata respectively from each of the first, second, and third sets of metadata, each of the first records of metadata including the respective first source index location and the respective first target index location, each of the respective second records including the respective second source index location and the respective second target index, and each of the respective third records including the respective third source location, the respective first target location and the respective second target location;
    associate each of the first records of metadata with each of the respective first segments, each of the second records of metadata with each of the respective second segments and each of the third records of metadata with each of the respective third segments; and
    include each of the first, each of the second and each of the third records in the media file containing data for presenting the plurality of pre-defined assembled media content items.

11. The system of claim 9, the processor further programmed to:
    generate directory data from each of the first, each of the second, and each of the third sets of metadata, the directory data including each of the first source index locations, each of the first target index locations, each of the second source index locations and each of the second target index locations; and
    include the directory data in the media file containing data for presenting the plurality of pre-defined assembled media content items.

12. The system of claim 9, the processor further programmed to:
    receive a plurality of original media content items, the plurality of original media content items including the first original media content item and the second media content item;
    analyze each of the plurality media content items to identify a plurality of segments of related media content; and
    include the plurality of identified segments in the plurality of segments.

13. The system of claim 12, the processor further programmed to
    identify a first portion of segments in the first media original content item targeted for display in the first pre-defined assembled media content; and
    identify a second portion of segments in the first original media content item targeted for display in the second pre-defined assembled media content; wherein:
        the first portion of identified segments is a subset of the second portion of identified segments.

14. The system of claim 12, the plurality of identified segments including a first identified segment, the processor further programmed to:
    identify a characteristic in a first identified segment;
    generate a first alternate segment from the first identified segment, the first alternate segment being modified to alter the characteristic; and include the alternate segment in the plurality of segments.

15. The system of claim 12, wherein:
the identified segments include:
- a first portion targeted for display in each of the first pre-defined assembled media content and the second pre-defined assembled media content;
- a second portion targeted for display in the first pre-defined assembled media content and not intended for display in the second pre-defined assembled media content; and
- a third portion targeted for display in the second pre-defined assembled media content and not intended for display in the first pre-defined assembled media content.

16. The system of claim 15, wherein the first pre-defined assembled media content is substantially identical to the first original media content item and the second pre-defined assembled media content is substantially identical to the second original media content item.

* * * * *